United States Patent Office

Re. 27,037
Reissued Jan. 19, 1971

27,037

PROCESS FOR THE PRODUCTION OF EXTRA LOW CARBON STAINLESS STEEL

William Bleloch, Parktown, Johannesburg, Transvaal, Republic of South Africa, assignor to Rand Mines Limited, Johannesburg, Transvaal, Republic of South Africa No Drawing. Original No. 3,300,302, dated Jan. 24, 1967, Ser. No. 355,895, Mar. 30, 1964. Application for reissue Dec. 10, 1968, Ser. No. 783,443
Claims priority, application Republic of South Africa, Apr. 1, 1963, 63/1,393
Int. Cl. C22c *39/20, 39/26, 39/44*
U.S. Cl. 75—130.5 8 Claims

Matter enclosed in heavy brackets [ ] appears in the original patent but forms no part of this reissue specification; matter printed in italics indicates the additions made by reissue.

*ABSTRACT OF THE DISCLOSURE*

*The production of a low carbon stainless steel wherein a reductant is introduced with iron ore slag into a ladle, the contents being reladled to complete the reaction, separating the steel from the slag and adding the necessary alloying elements which yield a stainless steel.*

This invention relates to the manufacture of steels which are alloys of iron and chromium with a very low carbon content and more particularly to the manufacture of stainless steel which may include further alloying elements such as nickel, copper, molybdenum, vanadium and the like.

The proportion of carbon in such steels has a very great effect on corrosion resistance, and also other desirable properties such as ductility, weldability and deep drawing qualities, these being improved the lower the proportion of carbon in the steels. For this reason, ELC stainless steels (that is extra low carbon stainless steels) having a maximum carbon content of 0.03 percent are of great and rapidly increaing importance.

The present availability of ELC stainless steels is due entirely to the oxygen refining process, but the present very high cost is also due to features inherent in the oxygen refining technique. Because carbon can be oxidised and removed from chromium steel by oxygen refining preferentially to chromium it is possible by oxygen lancing or jetting to reduce the carbon content of molten chromium steel to 0.06 percent with relative ease, and without undue over-oxidation and loss of chromium in the refining process. When oxygen refining is pressed beyond this limit of 0.06 percent carbon, much more oxygen is consumed, the temperature required is much higher, refractories life decreases sharply, the steel is heavily over-oxidised, and there is an almost total loss of chromium, and of vanadium if that element is present. The ELC steel so obtained by oxygen blowing is difficult effectively to de-oxidise; its chromium content must be brought up to specification almost entirely by addition of the very expensive 0.03 percent low-carbon ferrochromium free from tramp elements; and it is almost impossible to achieve a significant vanadium content in the finished steel by addition of exceedingly expensive low-carbon ferro-vanadium even after the steel has been de-oxidised as far as possible with ferro-silicon, without excessive loss of vanadium into the slag.

In the commercial manufacture of stainless steel sheets and other articles from the ingots there is a very large proportion of scrap produced, for example, up to 50%, and for economic reasons this is normally returned for reprocessing. For re-use, this revert scrap may be melted in an arc furnace and during this operation picks up carbon from the electrodes so that even if the revert scrap is an ELC 18/8 stainless steel, for example, it still picks up carbon on melting and this excess carbon is difficult to remove in the manufacture of a new batch of ELC stainless steel.

The object of this invention is to provide a simple and effective method of obtaining a substantially carbon-free ferrous material for alloying into stainless steel to meet particular requirements and to include modifications to this fundamental process to enable alloying elements to be introduced in the most economic manner dependent on the particular circumstances of the particular ores and other constituents available for the production of the stainless steel.

In accordance with this invention the method of production of ELC stainless steel comprises the simultaneous introduction into a ladle of a solid crushed reductant alloy of iron and silicon and a molten superheated basic iron ore slag, the ladle contents being thereafter reladled to bring the reaction to completion, separating the steel so formed from the slag and including in this steel the necessary alloying elements to yield the stainless steel of desired composition.

Further features of this invention provide for the alloying elements to be included in the final stainless steel by introduction of the elements as their oxides or other suitable compounds in the basic iron ore slag or during manufacture of the silicon reductant or by introducing the elements in a solid or molten state in the ladle reaction or by introducing the elements into a remelted cast product from the ladle reaction or in any combination of these ways.

The invention also provides for the silicon reductant to have a silicon content of between about 45 and about 75 percent by weight.

In a preferred form of this invention it is found that the iron ore slag is very conveniently produced from a Transvaal type titaniferous iron ore having a vanadium pentoxide content. The complete operation for the manufacture of a nickel containing stainless steel may comprise four stages as follows:

(1) Revert chromium-nickel stainless steel scrap, or other chromium-nickel stainless steel scrap and ferrochromium, are converted to an alloy of chromium, iron, nickel and silicon with a subordinate amount of aluminium, by introducing these metals or alloys into a submerged arc furnace for producing the silicon alloy. If the stainless steel scrap is available it provides the source of the nickel in the silicon alloy. If the nickel is not available from this source it may be obtained elsewhere. It is to be understood that the alloying elements need not essentially form part of the reductant but may be introduced into the final stainless steel product in any of the ways set out in the specification. The silicon alloy has a silicon content preferably between about 45 and about 75 percent, and it therefore has a very low carbon content, of the order of 0.04 percent or lower because of displacement of carbon by silicon.

(2) A slag is made in a separate open-arc Heroult type furnace by melting together Transvaal titaniferous iron ore containing 0.5% to 2% or higher of vanadium pentoxide the ore being crushed to 100% minus 1 inch, or finer, and burned lime in the proportions lying between 40 to 100 parts by weight of burned lime to 100 parts of the iron ore.

(3) The silicon alloy produced as in stage (1) is crushed to 100% minus ½ inch and reacted with the molten and superheated iron-ore lime slag made as in stage (2) by simultaneous pouring of the molten slag and cold crushed silicon alloy into a basic-lined or neutral lined ladle. Revert chromium-nickel ELC stainless steel scrap, other ELC stainless steel scrap, low carbon ferrochromium, nickel, other alloying elements, or some or all of these metals, is or are added cold to the ladle prior to the reaction, and/or during subsequent reladling to act as alloying additions in the correct proportions, and also to act as coolants to increase the life of the ladle lining. The ladle is lined with magnesite or other brick and rammed with magnesite or other basic ramming refractory in its lower working part, and with a chromite or iron ore and sodium silicate ramming mixture in its upper working part, or with high alumina fire brick in its upper working part, or alternatively is entirely lined with basic ramming material.

(4) The contents of the reaction ladle are then reladled with one or more pourings into other ladles and the final slag separted as far as possible by top pouring. The contents of the final top pour ladle are then transferred to a bottom-pour teeming ladle and the metal, which is now the finished ELC stainless steel is finally teemed into ingot moulds for rolling.

The following specific example will clearly indicate the method of carrying out the invention.

Transvaal titaniferous iron ore containing 11.5 percent $TiO_2$, 54.2 percent iron and 1.51 percent vanadium pentoxide was crushed to 100% minus 1 inch and melted in a 1500 kva. Herouls type arc furnace basic lined with 70 parts by weight of burned lime containing 91.6 percent calcium oxide. 3000 lbs. of the molten slag, superheated to approximately 1450° C., was poured into a top-pour ladle simultaneously with 640 lbs. of cold crushed (100%—½ inch) iron-chromium-silicon alloy having 14.1 percent iron, 26.2 percent chromium, 56.8 percent silicon, 0.032 percent carbon, the balance being essentially aluminium. The reaction mixture was poured from a height of about 8 feet within a few minutes into a second ladle into which there had previously been charged 160 lbs. of electrolytic nickel in the form of broken plates, and 150 lbs. of cold low carbon ferrochromium containing 56.4 percent chromium and 0.028 percent carbon broken to approximately fist-size lumps or smaller. The mixture was then re-ladled within a few minutes from a similar height back into the first ladle into which another 150 lbs. of the same ferrochromium had been placed. The mixture of slag and metal was then repoured twice from one ladle to the other, the final pouring being made into a bottom-pour ladle after discarding about two thirds of the slag to a wet slag-granulator, and the finished ELC chromium-nickel stainless steel was teemed into 500 lbs. ingot moulds and the steel recovered as ingot. The analysis of the finished steel was 0.024 percent carbon, 17.3 percent chromium, 9.8 percent nickel, 0.023 percent sulphur, 0.012 percent phosphorous, 0.62 percent vanadium and 0.24 percent manganese, the balance being mainly iron.

The above example illustrates a particular case where the alloying element vanadium was introduced through its oxide in the iron ore slag, chromium through its inclusion during the production of the reductant and with nickel in the ladle reaction.

The example shows the use of solid alloying elements in the reaction ladle but under some circumstances it may be desirable to introduce them in a molten state.

The product obtained in any of the manners referred to above and by generally following the four steps of production set out need not be teemed into ingot moulds for final processing but may be cast to form stock base metal for remelting and alloying with the necessary elements to give a stainless steel meeting specified requirements.

The product of this remelting will be either teemed into required ingot size or cast continuously as may be required.

To illustrate this latter modification to the process an example is given using a steel obtained by the method generally set out above.

In this example the steel produced as described is used as stock material for remelting and had the following composition by weight:

| | Percent |
|---|---|
| C | 0.018 |
| Si | 0.21 |
| Mn | 0.24 |
| Cr | 18.3 |
| V | 0.63 |

The steel was remelted in a high frequency induction furnace having a silica lining. The steel was then further alloyed with nickel, chromium, manganese and copper and cast into 400 lbs. ingots by bottom pouring from a one inch diameter nozzle via a hot-top of conventional design.

The finished ingot gave a final percentage analysis as follows:

| | Percent |
|---|---|
| C | 0.015 |
| Cr | 18.6 |
| Ni | 13.9 |
| Cu | 2.98 |
| Mn | 1.46 |
| V | 0.44 |
| Si | 0.38 |

$S<0.02$

P (by weight) $<0.01$

It will be appreciated that the alloying elements may be introduced into the final steel in a variety of combinations using the fundamental technique of reducing a basic iron ore slag to a steel of negligible carbon content.

It will also be appreciated that the rate of reaction between the basic iron ore slag and the reductant as hereinbefore described, may be modified by the introduction of suitable diluent metals and/or slag forming materials in the ladle or with the reductant.

What I claim as new and desire to secure by Letters Patent is:

1. A process for the production of extra low carbon stainless steel comprising the reaction of a reductant with an iron ore slag by the simultaneous introduction into a ladle of a [solid crushed] silicon reductant alloy having a silicon content of between about 45 percent to about 75 percent by weight and having a carbon content of less than approximately 0.04% carbon and a molten superheated basic iron ore lime slag comprising lime in the amount of at least .4 by weight of the iron ore, the ladle contents being thereafter reladled to bring the reaction to completion, separating the steel so formed from the slag and including in this steel the necessary alloying elements to yield a stainless steel of desired composition.

2. A process as claimed in claim 1 in which at least one of the alloying eelments is introduced into the final stainless steel by its inclusion as oxides in the iron ore slag, said iron ore slag containing 0.5 percent to 2 percent of the alloying element vanadium pentoxide.

3. A process as claimed in claim 1 in which at least one of the alloying elements is included in the silicon reductant during preparation of the latter.

4. A process as claimed in claim 1 in which at least one of the alloying elements is introduced by insertion into the reaction ladle prior to the simultaneous pouring of slag and reductant.

5. A process as claimed in claim 1 in which at least one of the alloying elements is introduced by insertion into the reaction ladle during the reaction process.

6. Process of producing extra low carbon stainless steel comprising producing a silicon alloy wherein the silicon content is between 45% and 75% by melting chromium-nickel stainless steel scrap, iron, silicon and ferro-chromium and allowing the molten product to solidify; producing slag by melting together iron ore containing .5% to 2% of vanadium pentoxide and burned lime, the lime being in the amount of at least approximately 40% by weight of the iron ore; simultaneously introducing said silicon alloy in cold crushed form and said iron-ore lime slag in molten state in a reaction ladle; reladling the contents of said reaction ladle; and separating the slag from the molten metal by top pouring.

*7. The process of claim 1 wherein the reductant alloy is introduced into the ladle in a molten state.*

*8. The process of claim 1, wherein the reductant alloy is introduced into the ladle in a solid crushed state.*

References Cited

The following references, cited by the Examiner, are of record in the patented file of this patent or the original patent.

UNITED STATES PATENTS

| | | | |
|---|---|---|---|
| 1,901,367 | 3/1933 | Custafesson | 75—130.5X |
| 2,100,264 | 11/1937 | Perrin | 75—24 |
| 2,100,265 | 11/1937 | Perrin | 75—130.5X |
| 2,455,073 | 11/1948 | Loveless | 75—130.5X |
| 2,455,074 | 11/1948 | Loveless | 75—130.5X |
| 3,043,681 | 7/1962 | Udy et al. | 75—30X |
| 3,074,793 | 1/1963 | Kuhlmann | 75—30X |
| 3,149,962 | 9/1964 | Mennenoh | 75—30X |

HYLAND BIZOT, Primary Examiner

J. E. LEGRU, Assistant Examiner

U.S. Cl. X.R.

75—30, 133.5